(12) United States Patent
Hayakawa et al.

(10) Patent No.: US 12,145,654 B2
(45) Date of Patent: Nov. 19, 2024

(54) REAR VEHICLE BODY STRUCTURE

(71) Applicant: HONDA MOTOR CO., LTD., Tokyo (JP)

(72) Inventors: Hirotaka Hayakawa, Tokyo (JP); Tsuyoshi Tanaka, Tokyo (JP); Takafumi Raitoku, Tokyo (JP); Kazuya Kimura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 312 days.

(21) Appl. No.: 17/947,212

(22) Filed: Sep. 19, 2022

(65) Prior Publication Data

US 2023/0101270 A1  Mar. 30, 2023

(30) Foreign Application Priority Data

Sep. 24, 2021  (JP) .................................. 2021-155767

(51) Int. Cl.
*B62D 25/08* (2006.01)
*B62D 25/02* (2006.01)
*B62D 25/20* (2006.01)
*B62D 27/02* (2006.01)

(52) U.S. Cl.
CPC ....... *B62D 25/2027* (2013.01); *B62D 25/025* (2013.01); *B62D 25/2036* (2013.01); *B62D 27/023* (2013.01)

(58) Field of Classification Search
CPC .... B62D 25/08; B62D 25/20; B62D 25/2018; B62D 25/2027; B62D 25/025; B62D 27/023

USPC ......... 296/203.01, 4, 204, 193.07, 8, 29, 30
See application file for complete search history.

(56) References Cited

U.S. PATENT DOCUMENTS 8,287,032 B2 * 10/2012  Mori ...................... B62D 25/20
                                                      296/187.03
8,820,819 B2 *  9/2014  Tamaki .............. B62D 25/2009
                                                      296/65.05
11,173,965 B2 * 11/2021  Tsukamoto ............ B60N 2/005

FOREIGN PATENT DOCUMENTS

JP        2000-272544        10/2020

* cited by examiner

*Primary Examiner* — Dennis H Pedder
(74) *Attorney, Agent, or Firm* — Amin, Turocy & Watson, LLP

(57) ABSTRACT

A rear portion of a vehicle body includes a front floor panel, a rear floor panel, a pair of left and right side sills, and a front cross plate. The rear floor panel has a higher upper surface height than the front floor panel. The front cross plate connects a rear portion of the front floor panel and a front wall of the rear floor panel, and an outer end portion in a vehicle width direction is coupled to the left and right side sills. The front wall of the rear floor panel has a plurality of bent corner portions having a side view shape bent in a substantially L shape. At least one of the bent corner portions constitutes a closed cross section extending along the vehicle width direction together with the front cross plate in a vertical height range of the left and right side sills.

10 Claims, 4 Drawing Sheets

REAR VEHICLE BODY STRUCTURE

CROSS-REFERENCE TO RELATED APPLICATION

Priority is claimed on Japanese Patent Application No. 2021-155767, filed in Japan on Sep. 24, 2021, the entire content of which is incorporated herein by reference.

BACKGROUND OF THE INVENTION

Field of the Invention

The present invention relates to a rear vehicle body structure.

Description of Related Art

As a rear vehicle body structure of a vehicle, there is known a rear vehicle body structure in which a rear floor panel having a higher upper surface height than a front floor panel is connected to a rear portion of the front floor panel so as to form a step, and a fuel tank is disposed below a portion close to a front portion of the rear floor panel (see Japanese Unexamined Patent Application, First Publication No. 2000-272544).

In the rear vehicle body structure described in Japanese Unexamined Patent Application, First Publication No. 2000-272544, a front wall (vertical wall) bent downward and extending is provided at the front portion of the rear floor panel connected to a rear portion of the front floor panel, and a cross member forming a closed cross section extending along a vehicle width direction together with the front wall is connected to a back side (rear side) of the front wall. The front wall of the rear floor panel and an outer end portion of the cross member in the vehicle width direction are connected to a side sill which is a frame of a vehicle interior side portion. A central region of the cross member is offset upward with respect to the outer end portions in the vehicle width direction connected to left and right side sills.

In the rear vehicle body structure described in Japanese Unexamined Patent Application, First Publication No. 2000-272544, the fuel tank is disposed below the portion close to the front portion of the rear floor panel, and a front side of the fuel tank is reinforced by the closed cross section formed by the front wall of the rear floor panel and the cross member.

SUMMARY OF THE INVENTION

In the rear vehicle body structure described in Japanese Unexamined Patent Application, First Publication No. 2000-272544, the cross member whose central region is offset upward is coupled to a back portion of the front wall of the rear floor panel. Thus, when an impact load is input from one side of the vehicle to one side sill, it is necessary to sufficiently increase rigidity of the cross member itself and a peripheral region portion of the cross member in order to reliably receive the load. However, when a thickness of the cross member is increased, a vehicle weight is increased, and when a further reinforcing structure is added to a peripheral region of the cross member, the vehicle weight and the number of parts are increased.

An aspect according to the present invention has been made in view of such circumstances, and an object of the present invention is to provide a rear vehicle body structure capable of reliably protecting a mounted object disposed below a front portion of a rear floor panel while suppressing an increase in the number of parts and an increase in weight.

In order to address the above issue and achieve the object, the present invention adopts the following aspects.

(1) A rear vehicle body structure according to one aspect of the present invention includes: a front floor panel; a rear floor panel that is disposed at a rear portion of the front floor panel and has a higher upper surface height than the front floor panel; a pair of left and right side sills that are arranged outside the front floor panel and the rear floor panel in a vehicle width direction and extend substantially along a vehicle front-rear direction; and a front cross plate that connects the rear portion of the front floor panel and a front wall of the rear floor panel and has an outer end portion in the vehicle width direction coupled to the left and right side sills, in which the front wall of the rear floor panel has a plurality of bent corner portions each having a side view shape bent in a substantially L shape, and at least one of the bent corner portions constitutes a closed cross section extending along the vehicle width direction together with the front cross plate in a vertical height range of the left and right side sills.

With the above configuration, the bent corner portion of the rear floor panel and the closed cross section formed by the front cross plate are arranged so as to vertically overlap the left and right side sills in the side view. Thus, when an impact load is input from one side of the vehicle to one side sill, the impact load is efficiently transmitted linearly to the other side sill side by the bent corner portion of the rear floor panel and the closed cross section along the vehicle width direction formed by the front cross plate. In this configuration, since the closed cross section for receiving the impact load from the side is constituted by the bent corner portion of the rear floor panel and the front cross plate, it is possible to suppress a significant increase in the number of parts for reinforcement.

(2) In the above aspect (1), a plurality of the bent corner portions may be arranged in the vertical height range of the left and right side sills.

In this case, since the plurality of bent corner portions of the front wall are arranged in the vertical height range of the left and right side sills, the impact load input from one side of the vehicle to one side sill can be efficiently transmitted to the other side sill side using the plurality of bent corner portions having high rigidity.

(3) In the above aspect (2), the front wall may include a first bent corner portion in the vertical height range of the left and right side sills and a second bent corner portion disposed on a rear upper side of the first bent corner portion, the front cross plate may include a rising wall rising upward from the rear portion of the front floor panel and a rear extending wall bending rearward and extending from an upper end portion of the rising wall, and the first bent corner portion and the second bent corner portion of the front wall may be joined to the rising wall and the rear extending wall of the front cross plate to constitute the closed cross section.

In this case, the first bent corner portion below a front portion of the front wall and the second bent corner portion on a rear upper side of the front wall constitute the vicinity of a front lower corner portion and the vicinity of a rear upper corner portion of the closed cross section extending in the vehicle width direction. For this reason, the rigidity in the vehicle width direction of the closed cross section extending along the vehicle width direction within the vertical height range of the left and right side sills is further enhanced.

(4) In any one of the above aspects (1) to (3), a rear side frame extending toward a vehicle rear side may be disposed on the inner side in the vehicle width direction of each of the left and right side sills, left and right edge portions on the outer side in the vehicle width direction of an upper wall of the rear floor panel may be joined to the corresponding left and right rear side frames, left and right edge portions on the outer side in the vehicle width direction of the front wall of the rear floor panel may be joined to the corresponding left and right side sills, and the bent corner portion disposed in the vertical height range of the left and right side sills may be disposed at least on the inner side in the vehicle width direction with respect to the rear side frame.

In this case, the impact load input from one side of the vehicle to one side sill is transmitted toward the other side sill through the rear side frame and the upper wall of the rear floor panel, and is linearly transmitted toward the other side sill through the bent corner portion of the front wall of the rear floor panel disposed in the vertical height range of the side sill. Thus, when this configuration is adopted, it is possible to enhance load transfer performance in the vehicle width direction while suppressing an increase in an area of the closed cross section extending in the vehicle width direction formed by the front wall of the rear floor panel and the front cross plate.

(5) In the above aspect (4), the front wall of the rear floor panel may include a front wall body wall that extends above the side sill on the inner side in the vehicle width direction with respect to the rear side frame, and a third bent corner portion continuous with the upper wall of the rear floor panel may be disposed at an upper edge portion of the front wall body wall.

In this case, since the third bent corner portion is disposed so as to connect the left and right rear side frames above the side sill, the impact load input from one side of the vehicle to one side sill can also be dispersed to the third bent corner portion and transmitted toward the other side sill. Thus, the area of the closed cross section extending in the vehicle width direction formed by the front wall of the rear floor panel and the front cross plate can be further reduced.

When an installation portion of the rear seat is disposed on the upper wall of the rear floor panel, the input load from the rear seat can be efficiently supported by the left and right rear side frames through the third bent corner portion. Therefore, when this configuration is adopted, support rigidity of the rear sheet can be enhanced.

(6) In the above aspect (5), in the front wall body wall, a central region in the vehicle width direction may be offset toward the front side of the vehicle with respect to an end region on the outer side in the vehicle width direction in top view.

In this case, the central region of the front wall body wall in the vehicle width direction is disposed close to a closed cross section extending in the vehicle width direction formed by the front wall of the rear floor panel and the front cross plate. Thus, when the installation portion of the rear seat is disposed on the upper wall of the rear floor panel, the load in the vertical direction input from the rear seat can be efficiently received by the closed cross section. Therefore, when this configuration is adopted, it is possible to further increase the support rigidity of the rear seat while suppressing the increase in the area of the closed cross section formed by the front wall of the rear floor panel and the front cross plate.

(7) In the above aspect (3), a reinforcing plate extending along the vehicle width direction may be joined to a back surface of the front cross plate facing the inside of the closed cross section.

In this case, the rigidity of the closed cross section extending in the vehicle width direction formed by the front wall of the rear floor panel and the front cross plate is enhanced by the reinforcing plate. Thus, when this configuration is adopted, it is possible to suppress an increase in size of an outer surface shape of the closed cross section formed by the front wall of the rear floor panel and the front cross plate.

(8) In the above aspect (7), a floor tunnel having a rear end portion coupled to a wall constituting the closed cross section of the front cross plate may be disposed at a center of the front floor panel in the vehicle width direction, and the reinforcing plate may be joined to a region of the front cross plate from a coupling portion with each of the left and right side sills to a vicinity of a coupling portion with the floor tunnel.

In this case, a portion of the front cross plate to which the floor tunnel is coupled is increased in rigidity by the floor tunnel. Thus, in the front cross plate, the rigidity from the coupling portion with each of the left and right side sills to the vicinity of the coupling portion with the floor tunnel is enhanced by the reinforcing plate. Therefore, when this configuration is adopted, the impact load input from one side of the vehicle to one side sill can be efficiently transmitted toward the side sill on the other side with high rigidity.

As compared with a case where the reinforcing plate continuously extends from one side sill to the other side sill, an extending length of the reinforcing plate can be shortened, and an increase in vehicle weight due to the reinforcing plate can be suppressed.

(9) In the above aspect (6), an expanded width portion having a front-rear width expanded on the vehicle rear side with respect to a front surface of the central region in the vehicle width direction of the front wall body wall of the rear floor panel may be provided at the outer end portion in the vehicle width direction of the front cross plate, an inclined surface inclined forward and downward between an upper ridgeline and a lower ridgeline extending in the vehicle width direction may be provided on an upper surface side of the expanded width portion, and the upper ridgeline and the lower ridgeline may extend to a position where the upper ridgeline and the lower ridgeline overlap, in the vehicle width direction, the bent corner portion disposed within the vertical height range of the side sill in the front wall of the rear floor panel.

In this case, since the upper ridgeline and the lower ridgeline provided on the expanded width portion on the outer side in the vehicle width direction of the front cross plate overlap the bent corner portion of the rear floor panel in the vehicle width direction, the impact load input from one side of the vehicle to one side sill is efficiently transmitted to the closed cross section formed by the bent corner portion of the rear floor panel and the front cross plate through the upper ridgeline and the lower ridgeline of the expanded width portion. According to this configuration, since the inclined surface inclined forward and downward is provided on the upper surface side of the expanded width portion of the front cross plate, a space under the feet of a rear seat on a door opening side is expanded, and ingress-and-egress performance of a rear seat occupant can be improved.

(10) In the above aspect (1), the bent corner portion of the rear floor panel and the closed cross section formed by the front cross plate may be formed in a rectangular shape in which a length in the vertical direction is longer than a length in the front-rear direction.

In this case, when the installation portion of the rear seat is disposed on the upper wall of the rear floor panel, the load in the vertical direction input from the rear seat side can be received with high rigidity by the closed cross section long in the vertical direction.

According to an aspect of the present invention, at least one of the bent corner portions of the front wall of the rear floor panel constitutes the closed cross section extending along the vehicle width direction together with the front cross plate in the vertical height range of the left and right side sills. Thus, it is possible to efficiently transmit the impact load input from one side of the vehicle to the other side of the vehicle while suppressing a significant increase in the number of parts for reinforcement. Therefore, when the aspect according to the present invention is adopted, it is possible to reliably protect a mounted object disposed below the front portion of the rear floor panel while suppressing the increase in the number of parts and the increase in weight.

DETAILED DESCRIPTION OF THE INVENTION

Figure 1:
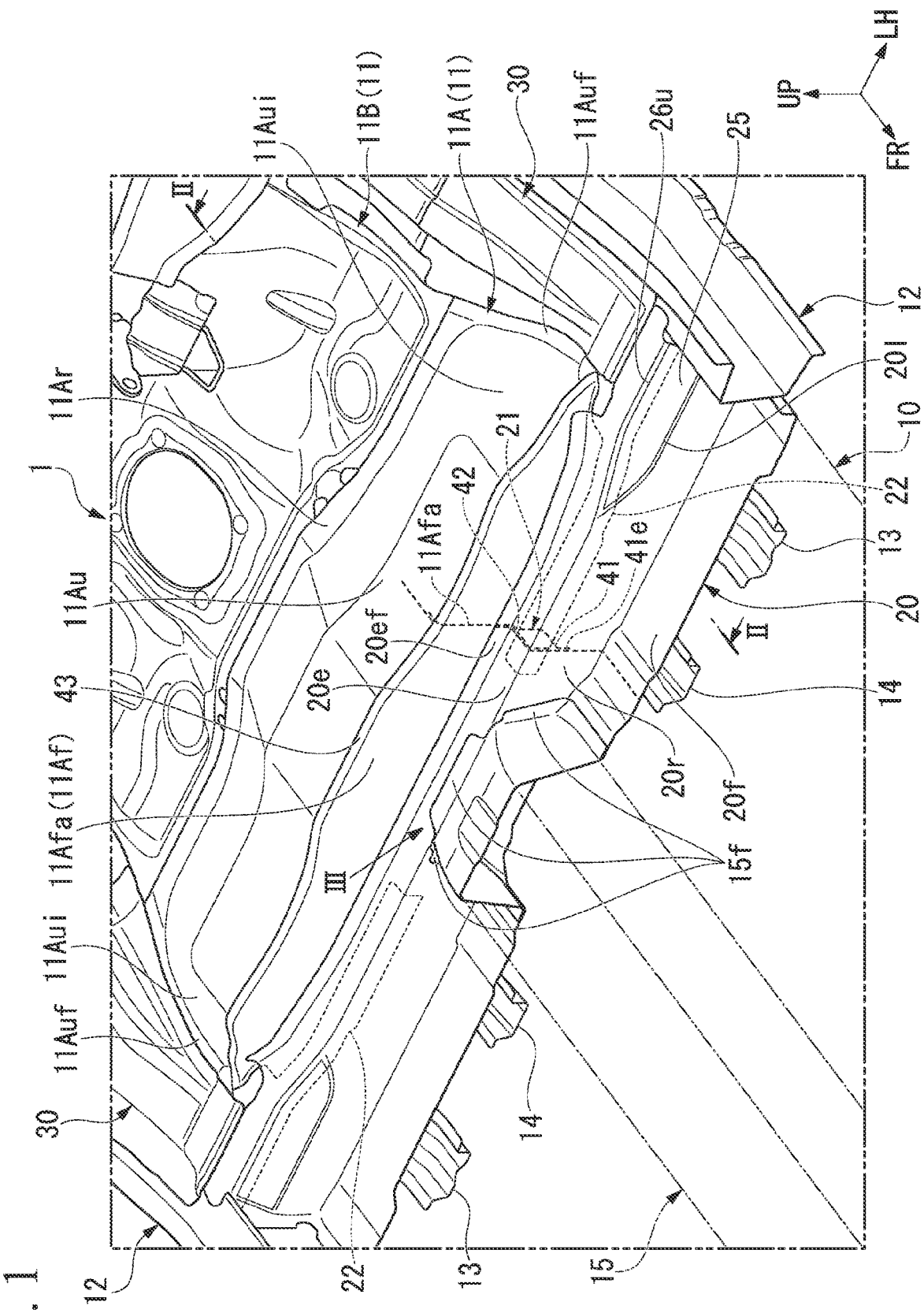
FIG. 1 is a perspective view of a rear portion of a vehicle body in an embodiment, when viewed from above.

Hereinafter, embodiments of the present invention will be described, on the basis of the drawings. In the following description, the terms front and rear, up and down, and right and left direction mean directions with respect to a forward direction of a vehicle unless otherwise specified. An arrow FR pointing to the front side of the vehicle, an arrow UP pointing to the upper side of the vehicle, and an arrow LH pointing to a left lateral side of the vehicle are given at appropriate positions in the drawings.

Figure 2:
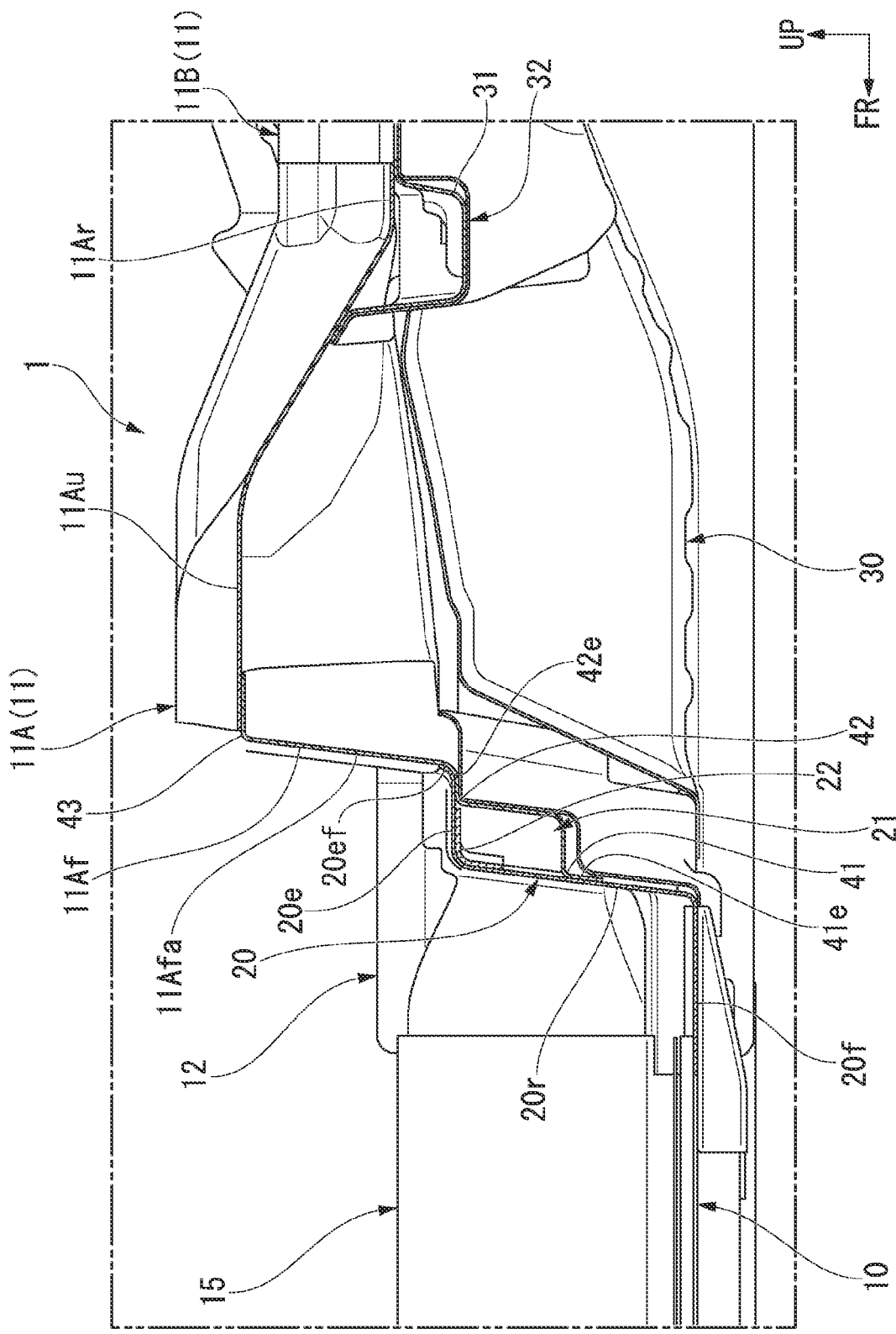
FIG. 2 is a cross-sectional view taken along line II-II of FIG. 1.
Figure 3:
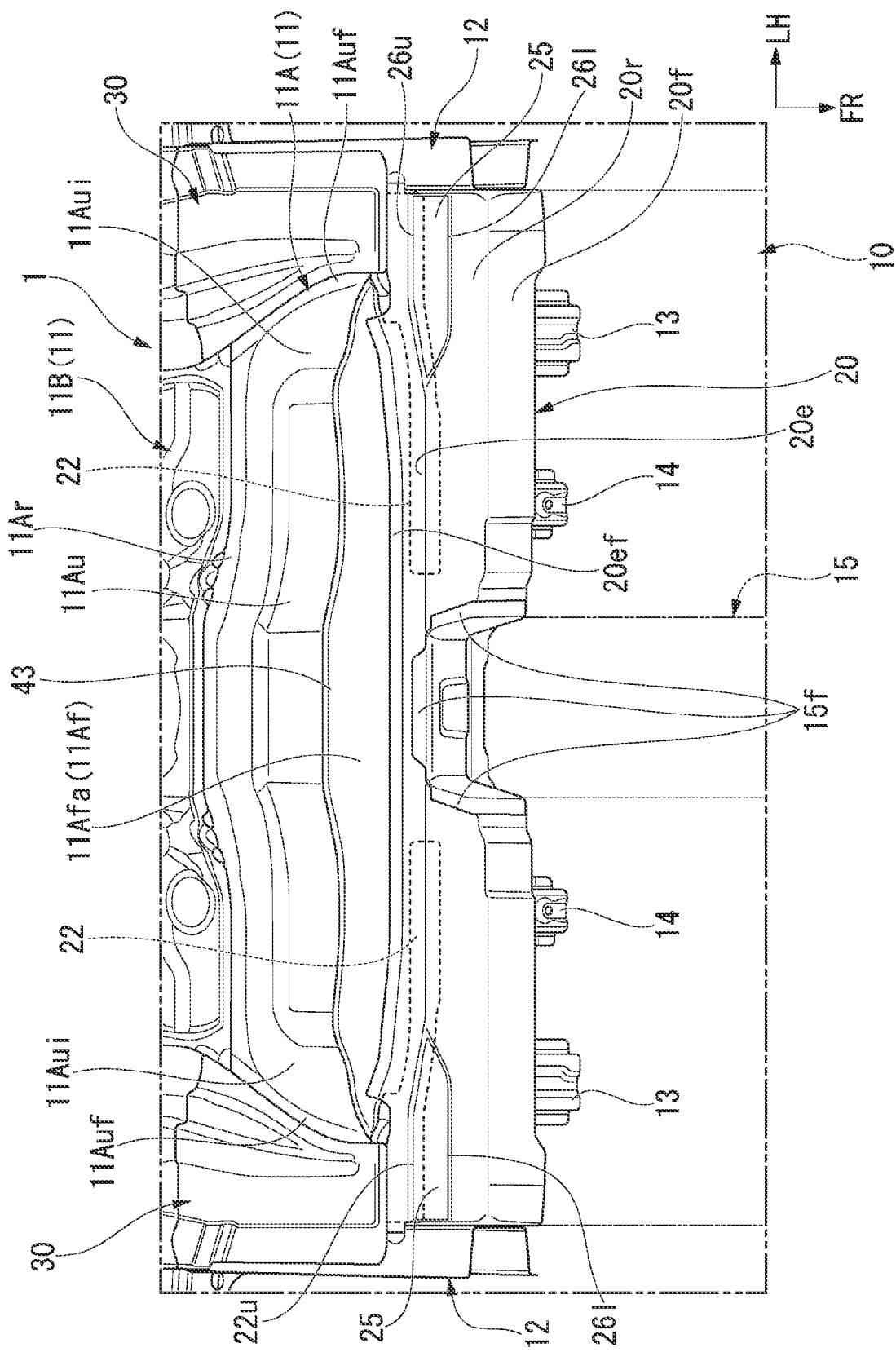
FIG. 3 is an arrow view when viewed in an arrow III of FIG. 1.

FIG. 1 is a perspective view of a rear portion of a vehicle body of a vehicle 1 of the present embodiment as viewed from an obliquely upper front left side, and FIG. 2 is a cross-sectional view taken along line II-II of FIG. 1. FIG. 3 is an arrow view when viewed in an arrow III of FIG. 1.

In the drawing, reference number 10 denotes a front floor panel disposed below a passenger compartment, and reference number 11 denotes a rear floor panel disposed behind the front floor panel 10. In FIG. 1, a main part of the front floor panel 10 is indicated by an imaginary line.

Side sills 12, which are frames extending along a vehicle front-rear direction, are arranged on both left and right sides on a lower portion side of the passenger compartment. The front floor panel 10 is bridged over the left and right side sills 12, and a lower surface side thereof is supported by a plurality of floor frames 13 and 14. The floor frames 13 and 14 are formed in a hat-shaped cross-sectional shape opened upward, and the hat-shaped cross section extends along the vehicle front-rear direction. A rear side frame 30 which is a frame extending toward a rear side of the vehicle body is coupled to an inner side in the vehicle width direction of a rear region of each of the side sills 12 on the left and right of the vehicle body. A rear region of the rear floor panel 11 is bridged over the left and right rear side frames 30. A front region of the rear floor panel 11 is bridged across the left and right side sills 12 and the rear side frame 30.

The front floor panel 10, the rear floor panel 11, the side sill 12, and the rear side frame 30, and main constituent members of the rear portion of the vehicle body described later are mainly formed of a metal material.

A floor tunnel 15 extending along the vehicle front-rear direction is provided at a center of the front floor panel 10 in the vehicle width direction. The floor tunnel 15 is formed in a substantially U-shaped cross-sectional shape opened downward, and the substantially U-shaped cross-sectional shape extends along the vehicle front-rear direction. The floor tunnel 15 bulges upward with respect to a substantially flat base wall (bottom wall extending substantially horizontally) of the front floor panel 10.

An upper surface height of the rear floor panel 11 is set higher than an upper surface of the front floor panel 10 as a whole. The rear floor panel 11 includes an upper bulging panel 11A disposed behind the front floor panel 10 and a rear extending panel 11B joined to a rear edge of the upper bulging panel 11A.

As illustrated in FIG. 2, the upper bulging panel 11A includes a rear flange 11Ar joined to a front end portion of the rear extending panel 11B, an upper wall 11Au that is inclined upward from the rear flange 11Ar toward the front side and extends forward substantially horizontally, and a front wall 11Af that bends downward and extends from a front end portion of the upper wall 11Au. A part of the front wall 11Af of the upper bulging panel 11A bulges upward with respect to an upper surface of the floor tunnel 15.

A fuel tank (not illustrated) is disposed below a front region of the upper bulging panel 11A. In the present embodiment, the fuel tank constitutes a mounted object mounted below the front portion of the rear floor panel 11. However, the mounted object mounted below the front portion of the rear floor panel 11 is not limited to the fuel tank, and may be, for example, a battery unit or the like including a battery module and a control device that is responsible for performing power control.

As illustrated in FIG. 1, in an outer region of the upper wall 11Au of the upper bulging panel 11A in the vehicle width direction, a side inclined portion 11Aui downward inclined outward in the vehicle width direction and extending and a joining flange 11Auf extending substantially horizontally outward in the vehicle width direction from a lower end of the side inclined portion 11Aui are formed. The joining flange 11Auf is formed so as to be continuous with the rear flange 11Ar of the upper bulging panel 11A. The left and right joining flanges 11Auf are welded and fixed to front regions of the corresponding left and right rear side frames 30, respectively. A central portion of the upper wall 11Au of the upper bulging panel 11A in the vehicle width direction bulges upward. A rear seat (not illustrated) is installed on an upper surface of a central region of the upper wall 11Au in the vehicle width direction. Thus, loads of the rear seat and a seated person act on the upper surface of the upper wall 11Au from above.

As illustrated in FIG. 2, a rear cross plate 31 having a substantially hat-shaped cross section intersecting the vehicle width direction is joined to a lower surface of a portion straddling a rear region of the upper wall 11Au of the upper bulging panel 11A and the rear flange 11Ar. The rear cross plate 31 extends along the vehicle width direction, and both ends in the vehicle width direction are joined to the left and right rear side frames 30. The rear cross plate 31 constitutes a closed cross section 32 extending along the vehicle width direction together with the rear edge of the upper bulging panel 11A.

Figure 4:
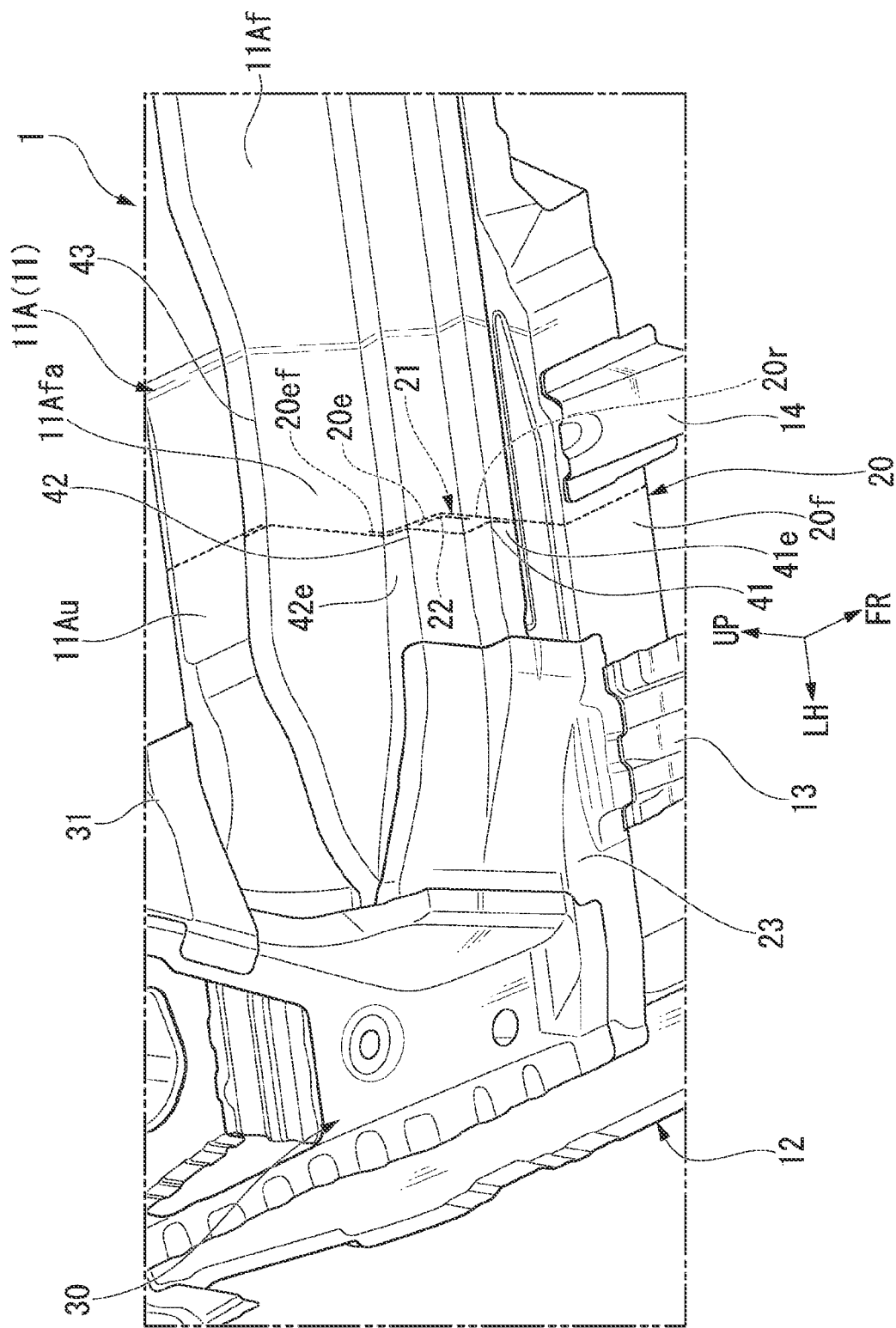
FIG. 4 is a perspective view of the rear portion of the vehicle body in an embodiment, when viewed from below.

FIG. 4 is a perspective view of the upper bulging panel 11A and a front side region thereof as viewed from a front lower side. As illustrated in FIGS. 2 and 4, the front wall 11Af of the upper bulging panel 11A includes a front wall body wall 11Afa bending downward and extending from the front end portion of the upper wall 11Au. On a lower side of the front wall body wall 11Afa, two bent corner portions 41 and 42 having a side view shape bent in a substantially L shape are continuously provided. The bent corner portion 41 is disposed at a lower position on a front side of the front wall 11Af, and the bent corner portion 42 is disposed at an upper position on a rear side with respect to the bent corner portion 41 of the front wall 11Af. Hereinafter, the bent corner portion 41 is referred to as the "first bent corner portion 41", and the bent corner portion 42 is referred to as the "second bent corner portion 42".

A rear wall standing above the second bent corner portion 42 is constituted by a lower region of the front wall body wall 11Afa. The first bent corner portion 41 and the second bent corner portion 42 continuously extend in the vehicle width direction, and apexes of the respective bends form a ridgeline extending along the vehicle width direction.

As illustrated in FIG. 2, the first bent corner portion 41 and the second bent corner portion 42 are arranged in a vertical height range of the left and right side sills 12.

A rear end portion of the front floor panel 10 and the front wall 11Af of the upper bulging panel 11A are connected via a front cross plate 20 extending along the vehicle width direction. The front cross plate 20 includes a front flange 20f overlapped with and joined to a rear edge portion of the front floor panel 10, a rising wall 20r rising upward from a rear end portion (rear portion of the front floor panel 10) of the front flange 20f, a rear extending wall 20e bending rearward and extending from an upper end portion of the rising wall 20r, and an end flange 20ef bending upward from a rear end portion of the rear extending wall 20e.

As illustrated in FIG. 2, a lower extending piece 41e of the first bent corner portion 41 of the front wall 11Af of the upper bulging panel 11A is overlapped on a back surface (rear surface) of a substantially central portion in a height direction of the rising wall 20r, and the lower extending piece 41e is joined in this state. A rear edge portion of the rear extending wall 20e is overlapped with an upper surface of a rear extension piece 42e of the second bent corner portion 42 of the front wall 11Af of the upper bulging panel 11A, and is joined to the rear extension piece 42e in this state. The end flange 20ef is overlapped with a front surface closer to a lower end of the front wall body wall 11Afa of the front wall 11Af of the upper bulging panel 11A, and is joined to the front wall body wall 11Afa in this state.

The front cross plate 20 is joined to the front wall 11Af of the upper bulging panel 11A in this manner to form a rectangular closed cross section 21 extending along the vehicle width direction together with the front wall 11Af of the upper bulging panel 11A. More specifically, the shape of the closed cross section 21 is formed in a rectangular shape in which the length in the vertical direction is longer than the length in the front-rear direction. The closed cross section 21 partially includes the first bent corner portion 41 and the second bent corner portion 42, and is entirely located in the vertical height range of the left and right side sills 12.

The front flange 20f and the rising wall 20r are cut-out at a central portion of the front cross plate 20 in the vehicle width direction, and a rear end portion of the floor tunnel 15 is joined to a peripheral edge portion of the cut-out portion. As illustrated in FIGS. 1 and 3, a plurality of joining flanges 15f is provided at the rear end portion of the floor tunnel 15. These joining flanges 15f are joined to the rising wall 20r and the rear extending wall 20e of the front cross plate 20.

A reinforcing plate 22 extending along the vehicle width direction is joined to a back surface (back surfaces of the rising wall 20r and the rear extending wall 20e) facing the inside of the closed cross section 21 of the front cross plate 20. The reinforcing plate 22 has a substantially L-shaped cross section intersecting the vehicle width direction, and is joined to a region of the front cross plate 20 from a joint portion with each of the left and right side sills 12 to a vicinity of a joint portion with the floor tunnel 15.

A third bent corner portion 43 connected to the upper wall 11Au of the upper bulging panel 11A is provided at an upper edge portion of the front wall body wall 11Afa of the front wall 11Af of the upper bulging panel 11A. The third bent corner portion 43 has a side view shape bent in a substantially L shape similarly to the first and second bent corner portions 41 and 42. The third bent corner portion 43 extends in the vehicle width direction along the shape of the front end portion of the upper wall 11Au of the upper bulging panel 11A. Therefore, a ridgeline formed by a bending vertex of the third bent corner portion 43 extends in the vehicle width direction along the shape of the front end portion of the upper wall 11Au.

As illustrated in FIGS. 1 and 3, in the front wall body wall 11Afa of the upper bulging panel 11A, a central region in the vehicle width direction bulges forward with respect to an end region on the outer side in the vehicle width direction. That is, the central region in the vehicle width direction of the front wall body wall 11Afa is offset toward the front side of the vehicle with respect to the end region on the outer side in the vehicle width direction. As a result, a lower end of the central region in the vehicle width direction of the front wall body wall 11Afa is disposed close to the closed cross section 21 with respect to the end region on the outer side in the vehicle width direction.

Left and right edge portions on the outer side in the vehicle width direction of the front wall 11Af of the upper bulging panel 11A are joined to the corresponding left and right side sills 12, respectively. Specifically, as illustrated in FIG. 4, the outer end portion of the front wall 11Af in the vehicle width direction straddles upper front surface sides of the corresponding left and right rear side frames 30 in the vehicle width direction and is joined to the side sill 12. Reference number 23 in FIG. 4 denotes a coupling bracket for coupling the outer end portion of the front wall 11Af in the vehicle width direction to the corresponding left and right rear side frames 30 and the corresponding left and right side sills 12.

The first to third bent corner portions 41, 42, and 43 formed on the front wall 11Af of the upper bulging panel 11A are continuously provided on the inner side in the vehicle width direction with respect to at least the left and right rear side frames 30.

At both end portions on the outer side in the vehicle width direction of the front cross plate 20, expanded width portions 24 having a larger front-rear width from a front surface of the rising wall 20r (the front-rear width is expanded on the vehicle rear side) than that of a front surface of the central region in the vehicle width direction of the front wall body wall 11Afa of the upper bulging panel 11A are provided. The expanded width portion 24 is formed on the outer side in the vehicle width direction of the upper bulging panel 11A such that a part (rear portion) thereof reaches the outer side in the vehicle width direction of a mounted object such as a fuel tank.

In front upper regions of the right and left expanded width portions 24 of the front cross plate 20, inclined surfaces 25 inclined downward toward the front side are formed. The inclined surface 25 extends so as to obliquely cut off a part of the rising wall 20r and the rear extending wall 20e, and forms an upper ridgeline 26u and a lower ridgeline 26l extending in the vehicle width direction on an upper end side and a lower end side. In other words, the inclined surface 25 is inclined frontward and downward between the upper ridgeline 26u and the lower ridgeline 26l.

The upper ridgeline 26u extends linearly inward along the vehicle width direction from the outer end portion in the vehicle width direction of the expanded width portion 24, and then extends obliquely forward toward a corner portion where the rising wall 20r and the rear extending wall 20e intersect. The lower ridgeline 26l extends linearly inward along the vehicle width direction from the outer end portion in the vehicle width direction of the expanded width portion 24, and then extends obliquely upward toward the corner portion where the rising wall 20r and the rear extending wall 20e intersect. Therefore, after the inclined surface 25 extends from the outer end portion in the vehicle width direction toward the inner side in the vehicle width direction with a constant width, the front-rear width gradually decreases so that the upper ridgeline 26u and the lower ridgeline 26l are converged into the corner portion where the rising wall 20r and the rear extending wall 20e intersect.

The upper ridgeline 26u and the lower ridgeline 26l (inclined surface 25) of the left and right expanded width portions 24 extend to a position where the upper ridgeline 26u and the lower ridgeline 26l overlap, in the vehicle width direction, the first bent corner portion 41 and the second bent corner portion 42 (bent corner portion disposed within the vertical height range of the side sill 12) formed on the front wall 11Af of the upper bulging panel 11A (rear floor panel 11).

<Effects of Embodiments>

In the rear portion of the vehicle body of the vehicle 1 of the present embodiment, the bent corner portion (first bent corner portion 41, second bent corner portion 42) of the front wall 11Af of the rear floor panel 11 (upper bulging panel 11A) constitutes the closed cross section 21 extending along the vehicle width direction together with the front cross plate 20 in the vertical height range of the left and right side sills 12. Thus, the bent corner portion (first bent corner portion 41, second bent corner portion 42) of the rear floor panel 11 and the closed cross section formed by the front cross plate 20 are arranged so as to vertically overlap the left and right side sills 12 in the side view. As a result, when the impact load is input from one side of the vehicle 1 to one of the side sills 12, the impact load is efficiently transmitted linearly toward the other side sill 12 by the bent corner portion (first bent corner portion 41, second bent corner portion 42) of the rear floor panel 11 and the closed cross section 21 along the vehicle width direction formed by the front cross plate 20.

In the rear portion of the vehicle body of the vehicle 1 of the present embodiment, since the closed cross section 21 for receiving the impact load from the side is constituted by the bent corner portion (first bent corner portion 41, second bent corner portion 42) of the rear floor panel 11 and the front cross plate 20, it is possible to suppress a significant increase in the number of parts for reinforcement.

Therefore, when a rear vehicle body structure of the present embodiment is adopted, it is possible to reliably protect a mounted object (for example, a fuel tank) disposed below the front portion of the rear floor panel 11 while suppressing the increase in the number of parts and the increase in weight.

In the embodiment, although the closed cross section 21 is configured by the first bent corner portion 41 and the second bent corner portion 42 of the rear floor panel 11 arranged in the vertical height range of the left and right side sills 12, the closed cross section 21 may include only one bent corner portion or may include three or more bent corner portions.

However, when there are the plurality of (two or more) bent corner portions arranged within the vertical height range of the left and right side sills 12 as in the present embodiment, the impact load input from one side of the vehicle 1 to one of the side sills 12 can be efficiently transmitted toward the other side sill 12 using the plurality of bent corner portions having high rigidity.

In the rear portion of the vehicle body of the vehicle 1 of the present embodiment, the front wall 11Af of the rear floor panel 11 (upper bulging panel 11A) includes the first bent corner portion 41 on the front lower side and the second bent corner portion 42 on the rear upper side in the vertical height range of the left and right side sills 12. The front cross plate 20 includes the rising wall 20r rising upward from the rear portion of the front floor panel 10 and the rear extending wall 20e bending rearward and extending from the upper end portion of the rising wall 20r. The first bent corner portion 41 and the second bent corner portion 42 of the front wall 11Af of the rear floor panel 11 are joined to the rising wall 20r and the rear extending wall 20e of the front cross plate 20 to form the closed cross section 21.

In the rear vehicle body structure of the present embodiment, since the first bent corner portion 41 below the front portion of the front wall 11Af and the second bent corner portion 42 on the rear upper side of the front wall 11Af constitute the vicinity of the front lower corner portion and the vicinity of the rear upper corner portion of the closed cross section 21 extending along the vehicle width direction, the rigidity in the vehicle width direction of the closed cross section 21 extending along the vehicle width direction within the vertical height range of the left and right side sills 12 can be further enhanced.

In the rear portion of the vehicle body of the vehicle 1 of the present embodiment, the outer edge of the upper wall 11Au of the rear floor panel 11 (upper bulging panel 11A) in the vehicle width direction is joined to the corresponding left and right rear side frames 30, and the outer edge of the front wall 11Af of the rear floor panel 11 (upper bulging panel 11A) in the vehicle width direction is joined to the corresponding left and right side sills 12. The first bent corner portion 41 on the front lower side and the second bent corner portion 42 arranged in the vertical height range of the left and right side sills 12 are arranged on the inner side in the vehicle width direction with respect to at least the rear side frame 30.

According to this configuration, the impact load input from one side of the vehicle 1 to one of the side sills 12 is transmitted toward the other side sill 12 through the rear side frame 30 and the upper wall 11Au of the rear floor panel 11, and is linearly transmitted toward the other side sill 12 through the first bent corner portion 41 and the second bent corner portion 42 of the front wall 11Af of the rear floor panel 11.

Therefore, when the rear vehicle body structure of the present embodiment is adopted, it is possible to enhance load transfer performance in the vehicle width direction while suppressing the increase in the area of the closed cross section 21 extending in the vehicle width direction formed by the front wall 11Af of the rear floor panel 11 and the front cross plate 20.

In addition, in the rear portion of the vehicle body of the vehicle 1 of the present embodiment, the front wall 11Af of the rear floor panel 11 includes the front wall body wall 11Afa that extends above the side sill 12 on the inner side in the vehicle width direction with respect to the rear side frame 30. The third bent corner portion 43 connected to the upper wall 11Au of the rear floor panel 11 is provided at the upper edge portion of the front wall body wall 11Afa. Thus, the third bent corner portion 43 is disposed so as to connect the left and right rear side frames 30 above the side sill 12. As a result, the impact load input from one side of the vehicle 1 to one of the side sills 12 is also dispersed to the third bent corner portion 43 and transmitted toward the other side sill 12.

Therefore, when the rear vehicle body structure of the present embodiment is adopted, it is possible to further reduce the area of the closed cross section 21 formed by the front wall 11Af of the rear floor panel 11 and the front cross plate 20.

When this configuration is adopted, the seat load input from the rear seat onto the upper wall 11Au of the rear floor panel 11 can be efficiently supported by the left and right rear side frames 30 through the third bent corner portion 43. In particular, since the third bent corner portion 43 is downward inclined outward in the vehicle width direction along the side inclined portion 11Aui of the front wall 11Af of the rear floor panel 11, the seat load input onto the upper wall 11Au can be efficiently transmitted by the left and right rear side frames 30.

Therefore, when this configuration is adopted, support rigidity of the rear sheet can also be sufficiently enhanced.

In the rear portion of the vehicle body of the vehicle 1 of the present embodiment, the central region in the vehicle width direction of the front wall body wall 11Afa of the rear floor panel 11 (upper bulging panel 11A) is offset toward the front side of the vehicle with respect to the end region on the outer side in the vehicle width direction in top view. As a result, the lower end of the central region in the vehicle width direction of the front wall body wall 11Afa is disposed close to the closed cross section 21 extending in the vehicle width direction. Thus, the seat load in the vertical direction input from the rear seat can be efficiently received by the closed cross section 21 extending in the vehicle width direction.

Therefore, when the rear vehicle body structure of the present embodiment is adopted, it is possible to further increase the support rigidity of the rear seat while suppressing the increase in the area of the closed cross section 21 formed by the front wall 11Af of the rear floor panel 11 and the front cross plate 20.

In the rear portion of the vehicle body of the vehicle 1 of the present embodiment, since the reinforcing plate 22 extending along the vehicle width direction is joined to the back surface facing the inside of the closed cross section 21 of the front cross plate 20, the rigidity of the closed cross section 21 formed by the front wall 11Af of the rear floor panel 11 and the front cross plate 20 can be increased by the reinforcing plate 22. In particular, in the present embodiment, the reinforcing plate 22 is formed in a substantially L-shaped cross section, and the reinforcing plate 22 is joined across the rising wall 20r and the rear extending wall 20e of the front cross plate 20. Thus the rigidity of the closed cross section 21 can be more efficiently increased.

Therefore, when this configuration is adopted, it is possible to suppress the increase in size of the outer surface shape of the closed cross section 21 formed by the front wall 11Af of the rear floor panel 11 and the front cross plate 20 while sufficiently securing the rigidity.

In the structure of the rear portion of the vehicle body of the present embodiment, the reinforcing plate 22 is joined to the region of the front cross plate 20 from the joint portion with each of the left and right side sills 12 to the vicinity of the joint portion with the floor tunnel 15 having high rigidity. Thus, the rigidity between the left and right side sills 12 and the vicinity of the floor tunnel 15 of the front cross plate 20 is efficiently enhanced by the reinforcing plate 22. Therefore, when this configuration is adopted, the impact load input from one side of the vehicle 1 to one of the side sills 12 can be more efficiently transmitted toward the side sill 12 on the other side with high rigidity.

In addition, in the structure of the present embodiment, since the reinforcing plate 22 does not continuously extend from one of the side sills 12 to the other side sill 12, the extending length of the reinforcing plate 22 can be shortened, and the increase in vehicle weight due to the reinforcing plate 22 can be suppressed.

In the rear portion of the vehicle body of the vehicle 1 of the present embodiment, at the end portion on the outer side in the vehicle width direction of the front cross plate 20, the expanded width portion 24 having the front-rear width expanded on the vehicle rear side with respect to the front surface of the central region in the vehicle width direction of the front wall body wall 11Afa of the rear floor panel 11 is provided. The inclined surface 25 inclined forward and downward between the upper ridgeline 26u and the lower ridgeline 26l extending in the vehicle width direction is provided on the upper surface side of the expanded width portion 24, and the upper ridgeline 26u and the lower ridgeline 26l extend to the position where the upper ridgeline 26u and the lower ridgeline 26l overlap the first bent corner portion 41 and the second bent corner portion 42 in the vehicle width direction in the front wall 11Af of the rear floor panel 11.

In this configuration, since the upper ridgeline 26u and the lower ridgeline 26l provided on the expanded width portion 24 overlap the first bent corner portion 41 and the second bent corner portion 42 of the rear floor panel 11 in the vehicle width direction, the impact load input from one side of the vehicle 1 to one of the side sills 12 can be efficiently transmitted to the closed cross section 21 extending in the vehicle width direction through the upper ridgeline 26u and the lower ridgeline 26l.

In the present embodiment, after the inclined surface 25 extends from the outer end portion in the vehicle width direction toward the inner side in the vehicle width direction with a constant width, the front-rear width gradually decreases so that the upper ridgeline 26u and the lower ridgeline 26l are converged into the corner portion where the rising wall 20r and the rear extending wall 20e intersect. Thus, the impact load input from one side of the vehicle 1 to one of the side sills 12 can be efficiently transmitted to the corner portion where the rising wall 20r and the rear extending wall 20e intersect through the upper ridgeline 26u and the lower ridgeline 26l.

In addition, in the rear vehicle body structure of the present embodiment, since the inclined surface 25 inclined forward and downward is provided on the upper surface side of the expanded width portion 24 of the front cross plate 20, a space under the feet of a rear seat on a door opening side is expanded, and ingress-and-egress performance of a rear seat occupant can be improved.

In the rear portion of the vehicle body of the vehicle 1 of the present embodiment, the first and second bent corner portions 41 and 42 of the rear floor panel 11 and the closed cross section 21 formed by the front cross plate 20 are formed in a rectangular shape in which the length in the vertical direction is longer than the length in the front-rear direction. Thus, the load in the vertical direction input from the rear seat on the upper wall 11Au of the rear floor panel 11 can be received with high rigidity by the closed cross section 21 long in the vertical direction.

Therefore, when this configuration is adopted, the support rigidity of the rear sheet can be further enhanced.

The present invention is not limited to the above embodiments, and various design changes can be made without departing from the gist of the present invention.

For example, in the above embodiment, although the rear floor panel 11 is constituted of two members as the upper bulging panel 11A and the rear extending panel 11B, the rear floor panel 11 may include a single plate material. The rear floor panel 11 may include three or more plate members.

What is claimed is:

1. A rear vehicle body structure comprising:
    a front floor panel;
    a rear floor panel that is disposed at a rear portion of the front floor panel and has a higher upper surface height than the front floor panel;
    a pair of left and right side sills that are arranged outside the front floor panel and the rear floor panel in a vehicle width direction and extend substantially along a vehicle front-rear direction; and
    a front cross plate that connects the rear portion of the front floor panel and a front wall of the rear floor panel and has an end portion on an outer side in the vehicle width direction coupled to the left and right side sills,
    wherein the front wall of the rear floor panel has a plurality of bent corner portions each having a side view shape bent in a substantially L shape, and at least one of the bent corner portions constitutes a closed cross section extending along the vehicle width direction together with the front cross plate in a vertical height range of the left and right side sills.

2. The rear vehicle body structure according to claim 1, wherein a plurality of the bent corner portions are arranged in the vertical height range of the left and right side sills.

3. The rear vehicle body structure according to claim 2, wherein the front wall includes a first bent corner portion in the vertical height range of the left and right side sills and a second bent corner portion disposed on a rear upper side of the first bent corner portion, the front cross plate includes a rising wall rising upward from the rear portion of the front floor panel and a rear extending wall bending rearward and extending from an upper end portion of the rising wall, and
    the first bent corner portion and the second bent corner portion of the front wall are joined to the rising wall and the rear extending wall of the front cross plate to constitute the closed cross section.

4. The rear vehicle body structure according to claim 1, wherein a rear side frame extending toward a vehicle rear side is disposed on an inner side in the vehicle width direction of each of the left and right side sills,
    left and right edge portions on the outer side in the vehicle width direction of an upper wall of the rear floor panel are joined to the corresponding left and right rear side frames,
    left and right edge portions on the outer side in the vehicle width direction of the front wall of the rear floor panel are joined to the corresponding left and right side sills, and
    the bent corner portion disposed in the vertical height range of the left and right side sills is disposed at least on the inner side in the vehicle width direction with respect to the rear side frame.

5. The rear vehicle body structure according to claim 4, wherein the front wall of the rear floor panel includes a front wall body wall that extends above the side sill on the inner side in the vehicle width direction with respect to the rear side frame, and
    a third bent corner portion continuous with the upper wall of the rear floor panel is disposed at an upper edge portion of the front wall body wall.

6. The rear vehicle body structure according to claim 5, wherein in the front wall body wall, a central region in the vehicle width direction is offset toward the front side of the vehicle with respect to an end region on the outer side in the vehicle width direction in top view.

7. The rear vehicle body structure according to claim 3, wherein a reinforcing plate extending along the vehicle width direction is joined to a back surface of the front cross plate facing the inside of the closed cross section.

8. The rear vehicle body structure according to claim 7, wherein a floor tunnel having a rear end portion coupled to a wall constituting the closed cross section of the front cross plate is disposed at a center of the front floor panel in the vehicle width direction, and
    the reinforcing plate is joined to a region of the front cross plate from a coupling portion with each of the left and right side sills to a vicinity of a coupling portion with the floor tunnel.

9. The rear vehicle body structure according to claim 6, wherein an expanded width portion having a front-rear width expanded on the vehicle rear side with respect to a front surface of the central region in the vehicle width direction of the front wall body wall of the rear floor panel is provided at the end portion on the outer side in the vehicle width direction of the front cross plate,
    an inclined surface inclined forward and downward between an upper ridgeline and a lower ridgeline extending in the vehicle width direction is provided on an upper surface side of the expanded width portion, and
    the upper ridgeline and the lower ridgeline extend to a position where the upper ridgeline and the lower ridgeline overlap, in the vehicle width direction, the bent corner portion disposed within the vertical height range of the side sill in the front wall of the rear floor panel.

10. The rear vehicle body structure according to claim 1, wherein the bent corner portion of the rear floor panel and the closed cross section formed by the front cross plate are formed in a rectangular shape in which a length in the vertical direction is longer than a length in the front-rear direction.

* * * * *